(12) United States Patent
Odell

(10) Patent No.: US 7,106,431 B2
(45) Date of Patent: Sep. 12, 2006

(54) SENSOR FOR DETERMINING THE ANGULAR POSITION OF A RADIATING POINT SOURCE IN TWO DIMENSIONS

(75) Inventor: Don Odell, Milton, VT (US)

(73) Assignee: Ascension Technology Corporation

( * ) Notice: Subject to any disclaimer, the term of this patent is extended or adjusted under 35 U.S.C. 154(b) by 190 days.

(21) Appl. No.: 10/705,852

(22) Filed: Nov. 13, 2003

(65) Prior Publication Data

US 2005/0105081 A1 May 19, 2005

(51) Int. Cl.
*G01B 11/26* (2006.01)

(52) U.S. Cl. ............... 356/141.5; 356/152; 356/141; 356/172; 356/400; 250/203; 250/206; 250/203.2

(58) Field of Classification Search ............ 356/152, 356/141, 141.5, 400, 172; 250/203 R, 206, 250/203.2

See application file for complete search history.

(56) References Cited

U.S. PATENT DOCUMENTS 4,092,072 A * 5/1978 Ellis ..................... 356/141.5
5,502,568 A * 3/1996 Ogawa et al. ............. 356/620
6,456,363 B1 * 9/2002 Suzuki ....................... 355/69
6,819,426 B1 * 11/2004 Sezginer et al. ........... 356/401

* cited by examiner

*Primary Examiner*—Thomas H. Tarcza
*Assistant Examiner*—Luke Ratcliffe
(74) *Attorney, Agent, or Firm*—H. Jay Spiegel

(57) ABSTRACT

Embodiments of a device and a technique are disclosed for locating the angular position of a radiating point source with respect to a detector comprising a point source of radiation, a variable transmissivity mask with pseudo-random variations, a multi-element detector and computing means for interpreting the detected image. The mask pattern, when illuminated by a point source of radiation, casts an image on the detector array. Computing means determine the pattern shift to allow determination of point source angular location in two dimensions. The mask transmissivity pattern and corresponding image vary in two dimensions, in such a manner as to yield two correlation peaks that indicate the incident angle in two dimensions. The differential shift and common mode shift in correlation peaks indicate the respective angles of incidence, allowing determination of the angular position of the light source.

18 Claims, 7 Drawing Sheets

0 1 0 1 1 1 0 0 0 1 0
11 Bit URA

Two Axis Camera Using One Dimensional Sensor

SENSOR FOR DETERMINING THE ANGULAR POSITION OF A RADIATING POINT SOURCE IN TWO DIMENSIONS

BACKGROUND OF THE INVENTION

The present invention relates to a sensor for determining the angular position of a radiating point source in two dimensions. The present invention has particular pertinence in the field of surgery, with particular reference to close range surgical instrument tracking. Additionally, the present invention is applicable in the fields of virtual reality and pilot head tracking systems.

In the prior art, systems have been devised that employ one dimensional masked or coded apertures placed above multi-element one dimensional detectors. Such structure is disclosed in U.S. Pat. Nos. 4,810,870 and 5,408,323. In such systems, correlation techniques are employed to determine the position of a projected pseudo-random pattern on a detector surface by comparing signals from fixed detector elements arranged in a unique pattern or from comparison with fixed reference signals previously stored in a computer.

Additionally, it is known in the prior art to use a two dimensional aperture and a one dimensional detector in the form of a charge coupled device (CCD) to determine angular position in two dimensions. Such a system is disclosed in U.S. Pat. No. 4,092,072. A drawback of such a system is that it does not provide immunity from errors resulting from reflections, and does not yield sufficiently high enough resolution as is the case with techniques employing pseudo-random patterns and correlation techniques.

It is with the deficiencies in the prior art in mind, as described above, that the present invention was developed.

SUMMARY OF THE INVENTION

The present invention relates to a sensor for determining the angular position of a radiating point source in two dimensions. The present invention includes the following interrelated objects, aspects and features:

(1) In a first aspect of the present invention, a system is disclosed that permits operation of a method for determining the angular position of a point source of radiation with respect to a detector by examining the shift of a projected image of a two dimensional transmissivity mask. In particular, the mask is encoded with a pseudo-random pattern which may, if desired, consist of a multitude of V-shaped slits of a desired degree of transmissivity, for example, 50%.

(2) The slits are arranged in a linear pseudo-random pattern so that overlapping slits form regions of 100% transmissivity.

(3) Since the transmissivity pattern on the mask varies in two dimensions, relative movements between the point source and the sensor yield variations in two dimensions in such a manner as to yield two correlation signal peaks that indicate an incident angle in two dimensions. From this information, the angular position of the radiating point source with respect to the detector may be accurately determined in two dimensions.

As such, it is a first object of the present invention to provide a sensor for determining the angular position of a radiating point source in two dimensions.

It is a further object of the present invention to provide such a sensor in which a two dimensional transmissivity mask is provided with a pseudo-random pattern thereon.

It is a yet further object of the present invention to provide such a pseudo-random pattern in which overlapping aspects thereof create regions of 100% transmissivity.

It is a still further object of the present invention to provide such a sensor in which the pattern consists of a multitude of V-shaped slits.

These and other objects, aspects and features of the present invention will be better understood from the following detailed description of the preferred embodiments when read in conjunction with the appended drawing figures.

SPECIFIC DESCRIPTION OF THE PREFERRED EMBODIMENTS

Figure 1:
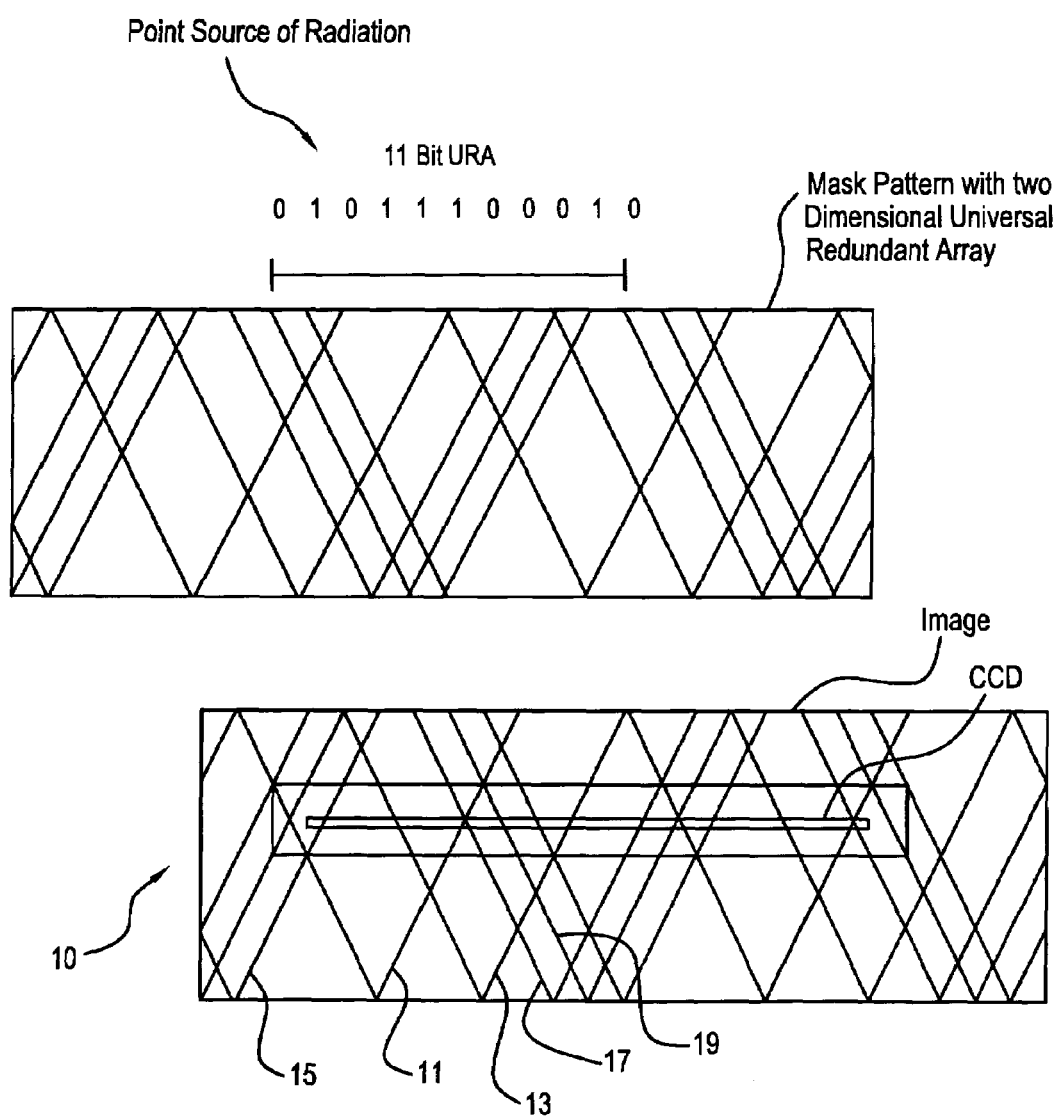
FIG. 1 shows a top view of a first example of a mask having a pattern in accordance with the teachings of the present invention, the mask overlying a sensor comprising a charge coupled device (CCD), the pattern derived from an 11 bit Universal Redundant Array (URA).

With reference, first, to FIG. 1, a rectangular mask is generally designated by the reference numeral 10 and is seen to include a pseudo-random pattern of "V" slits 11, 13, 15, 17, 19, etc. For simplicity of description, not every "V" slit is provided with a reference numeral, however, viewing of FIG. 1 provides a full explanation of the pattern which is being described herein.

As should be understood by those of ordinary skill in the art, where each "V" slit provides 50% transmissivity, locations where adjacent "V" slits overlap form locations of 100% transmissivity. As another example, where non-overlapping portions of the pattern have 50% transmissivity and overlapping portions of the pattern have 0% transmissivity, the mask background consequently comprises a region with 100% transmissivity.

Figure 2:
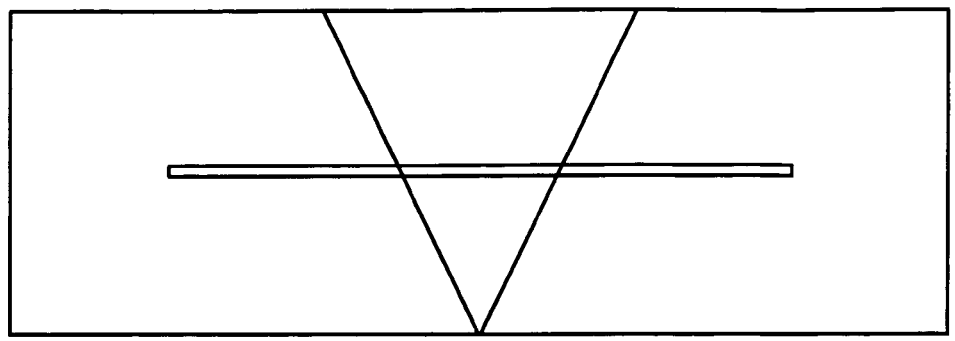
FIG. 2 shows a top view of a single "V" slit camera.
Figure 3:
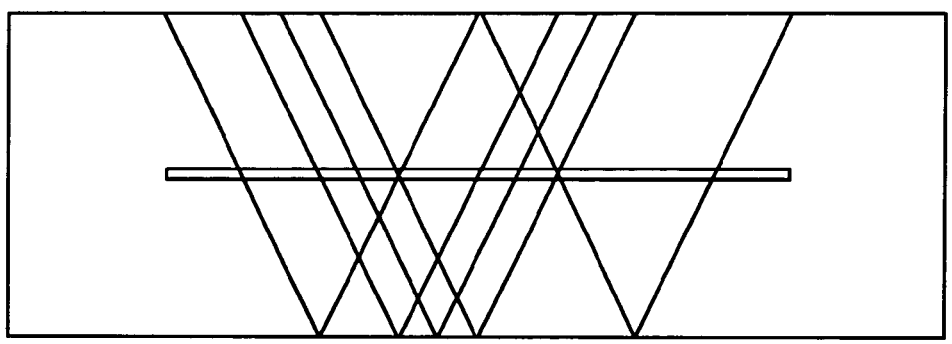
FIG. 3 shows a top view of a single sequence "V" slit camera.
Figure 4:
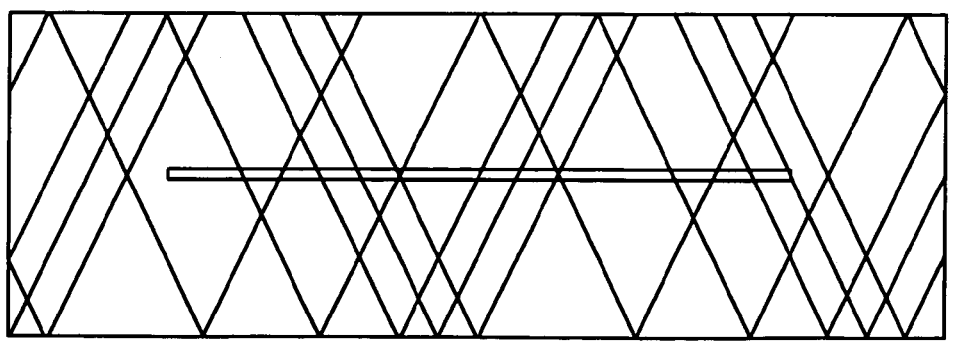
FIG. 4 shows a top view of a URA "V" slit camera.

FIGS. 2–4 show a variety of "V" slit patterns, with FIG. 2 showing a single "V" slit and FIGS. 3 and 4 showing more complex combinations of "V" slits. As should be understood from the above description of FIG. 1, since there are no areas of overlap of adjacent "V" slits in the FIG. 2 showing, there are no areas of enhanced transmissivity as is the case where adjacent "V" slits overlap in the embodiment of FIG. 1.

The FIG. 3 embodiment shows a single 11 bit "V" slit sequence. FIG. 4 shows a repeating sequence or URA of "V" slits. The pattern of "V" slits illustrated in FIGS. 1 and 4 is simplified as compared to the pattern that would actually be used in practice, the simplification being done to ease the explanation of the present invention. The Universal Redundant Array or URA is a particular sequence of a class of pseudorandom sequences that, when arranged in a redundant or repeating pattern, yield a constant cross-correlation for all delay values, except for that of zero delay or an integer multiple of the URA sequence length. In this way, a peak signal in the correlation function, indicative of pattern alignment, is perfectly distinguishable from the remainder of the correlation function, which in the URA case, is theoretically constant.

Figure 5:
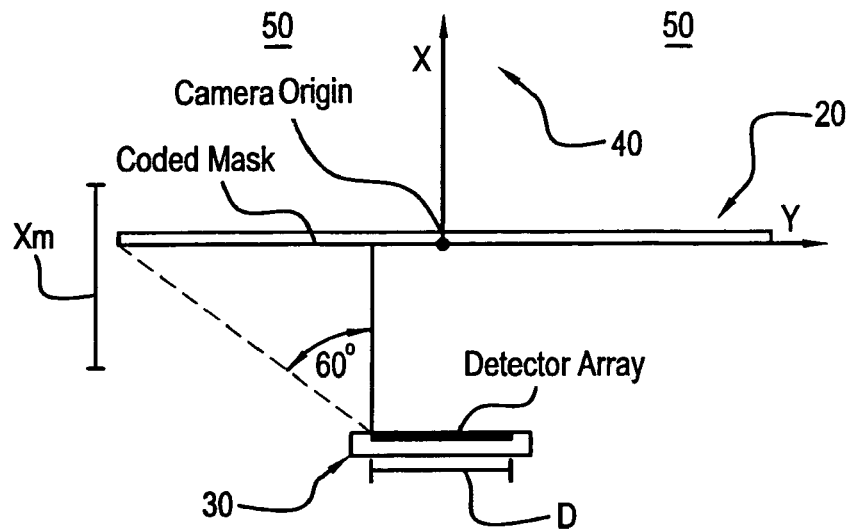
FIG. 5 shows a side view of a detector array with a coded mask overlying it.
Figure 6:
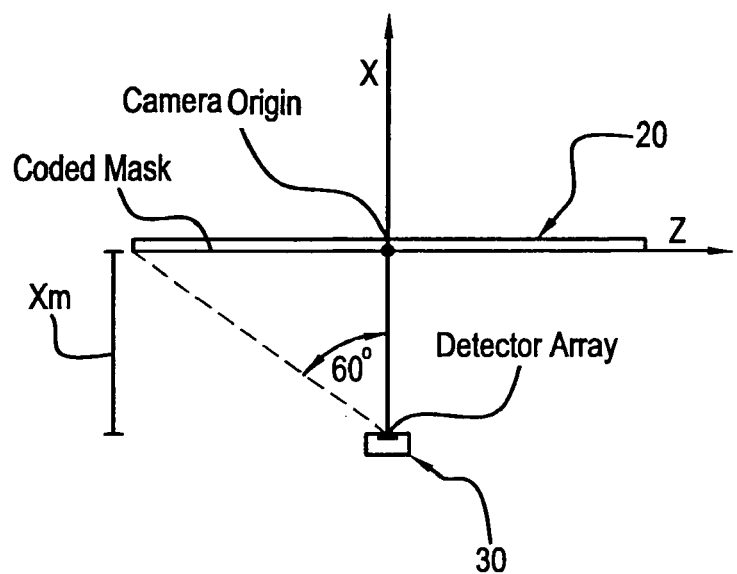
FIG. 6 shows an end view of the mask and detector shown in FIG. 5.
Figure 7:
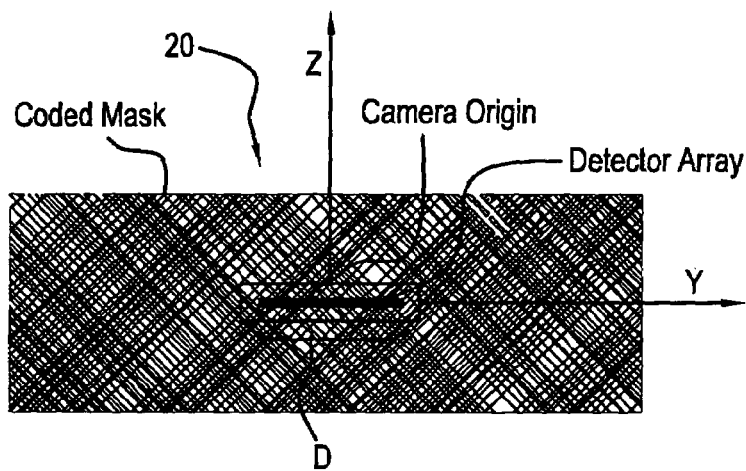
FIG. 7 shows a top view of the mask and detector of FIGS. 5 and 6.

With reference to FIGS. 5–7, it is seen that a coded mask 20 overlies a detector array 30 comprising a single linear row or column of active elements. As shown in FIG. 5, a point source of light 40 is located in a space 50. The mask 20 is adjacent the space 50 and between the space 50 and the detector array 30. FIG. 7 shows the pattern of "V" slits provided on the coded mask 20 as well as the degree by which the mask 20 extends laterally of each dimension of the detector array 30. As seen in FIGS. 5 and 6, the edges of the coded mask make an angle of 60° with respect to a line extending vertically from the center of the detector array 30 to the coded mask 20. This angle has been chosen to ensure that, with respect to the measuring space, light from a point source of light within the measuring space travels through the coded mask 20 and onto the detector array 30 rather than around the coded mask 20.

In practicing the teachings of the present invention, a correlation method is employed and angles of incidence of a point source of light in a measuring space are determined. The correlation method is as follows:

Letting g(y) represent the unshifted mask URA sequence, and $h(y,y_s,z_s)$ represent the shifted detected image, shifted by the unknown amount $y_s$ and $z_s$, the two functions can be expressed as $$g(y)=URA(y)$$

$$h(y,y_s,z_s)=URA(y-y_s-z_s)+URA(y-y_s+z_s).$$

An important distinction between g(y) and $h(y,y_s,z_s)$ is that the former represents substantially more than one complete URA sequence and preferably two full sequences, while the latter has only one complete URA sequence. This property is required to assure that the correlation will be null everywhere but at the points of alignment.

The cross correlation $(R_{g,h}(\tau))$ is most efficiently computed using the FFT method and is expressed as $$R_{g,h}(\tau)=FFT^{-1}(FFT\{URA(y)\} \cdot FFT^*\{URA(y-y_s-z_s)+URA(y-y_s+z_s)\}$$

where the notation $FFT^{-1}$ represents the inverse FFT and FFT* represents the complex conjugate of the FFT. The peak of the correlation function indicates the lag or lateral distance that the image has projected along the detector surface. Using the URA property, the resulting correlation can be expressed as $$R_{g,h}(\tau)=k[\delta(\tau-y_s-z_s)+\delta(\tau-y_s+z_s)].$$

Figure 8:
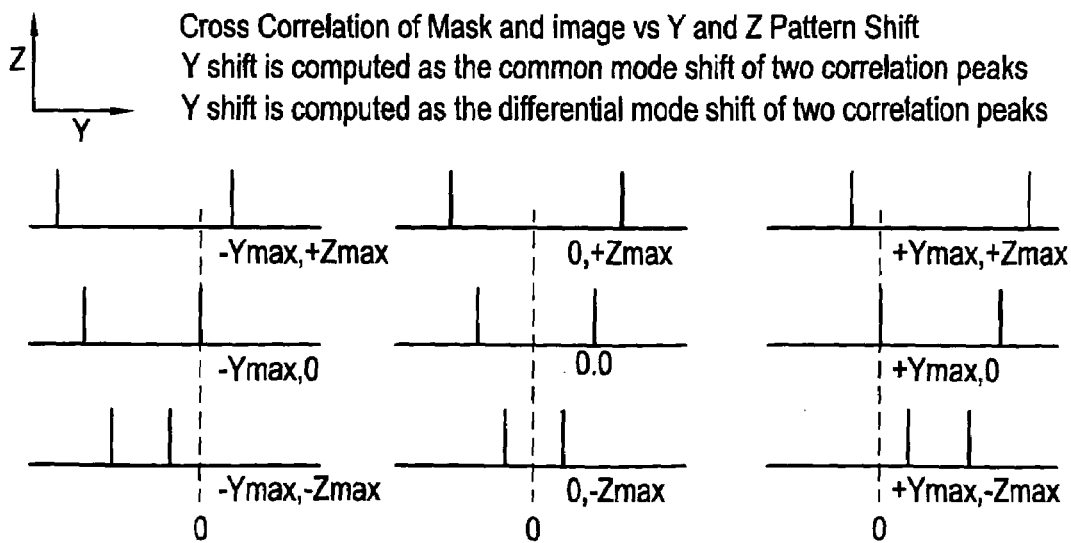
FIG. 8 shows conceptual drawings of correlation functions for various pattern shifts.

The correlation function consists of two impulses. The y shift is determined by the averaged or common mode shift of the impulse functions, while the z shift is determined by the separation or differential mode shift. FIG. 8 shows the correlation function for various image shifts.

Once the correlation function has been calculated for various image shifts, angles of incidence are determined from the image shifts $y_s$, $z_s$ and the mask height by calculation of the following equations:

$$\Theta_y=\mathrm{Tan}^{-1}(y_s/x_m)$$

$$\Theta_z=\mathrm{Tan}^{-1}(z_s/x_m).$$

If a refractive image path is used, then the angles of incidence in air $(\Theta_{yi})$ are computed for the angle of incidence in the refractive media $(\Theta_{yr})$ with index of refraction n, using the equation $$\Theta_{yi}=n_r \cdot \mathrm{Sin}^{-1}(\Theta_{yr}).$$

Figure 9:
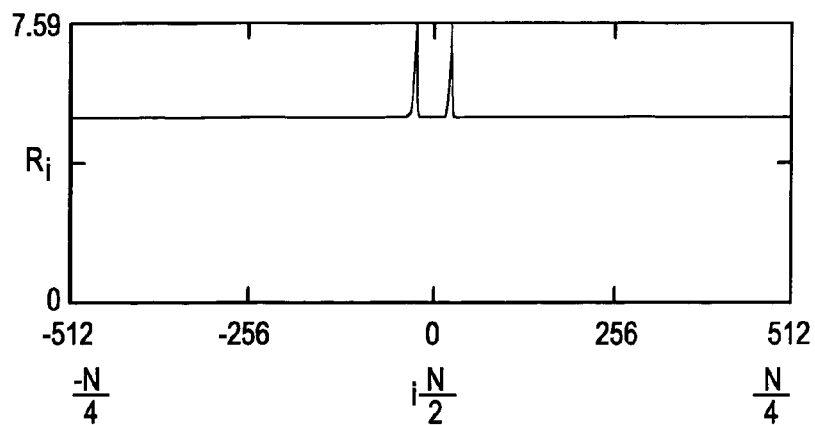
FIG. 9 shows a computation of a correlation function for a particular pattern shift.
Figure 10:
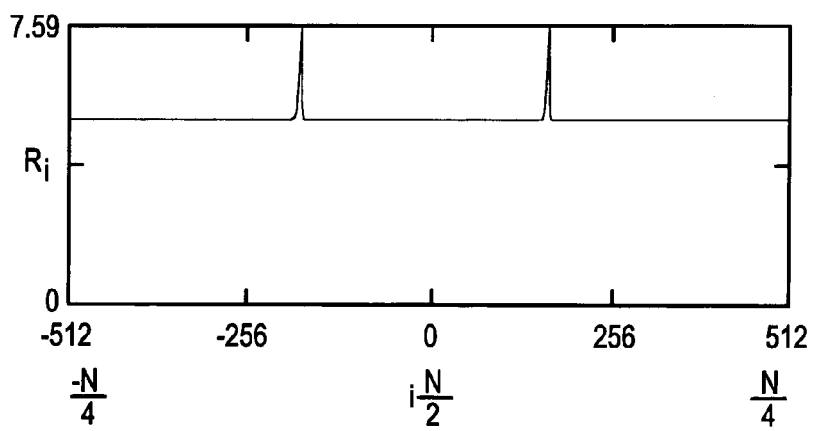
FIG. 10 shows a computation of a correlation function for a different pattern shift.
Figure 11:
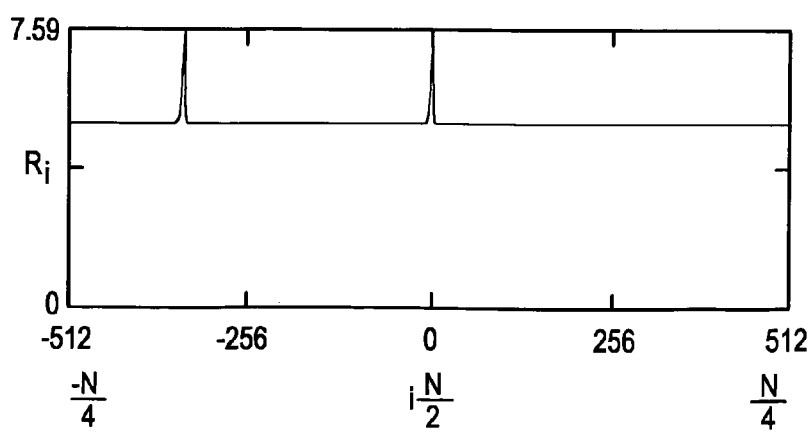
FIG. 11 shows a computation of a correlation function for a further pattern shift.
Figure 14:
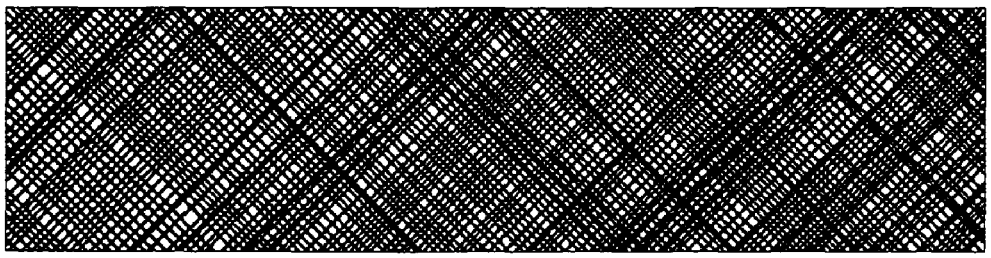
FIG. 14 shows a top view of a mask having a still further "V" slit URA pattern thereon.

FIG. 14 shows a coded mask having a 307 element "V" slit URA pattern. FIGS. 9–11 show respective simulation results for various shifts in y and z where the mask of FIG. 14 is employed.

Figure 12:
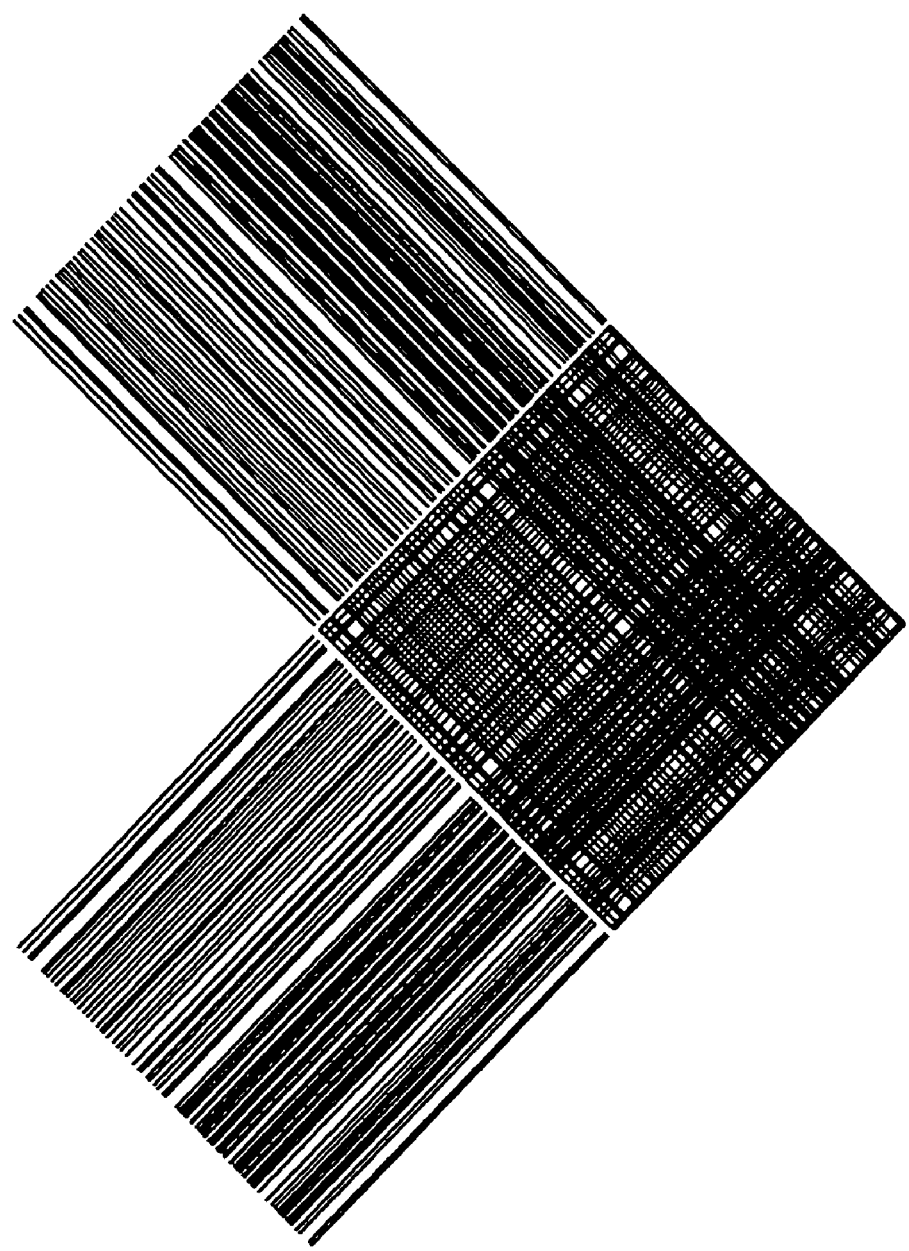
FIG. 12 shows a particular URA pattern and the formation of it by superimposing orthogonal one-dimensional URA patterns.
Figure 13:
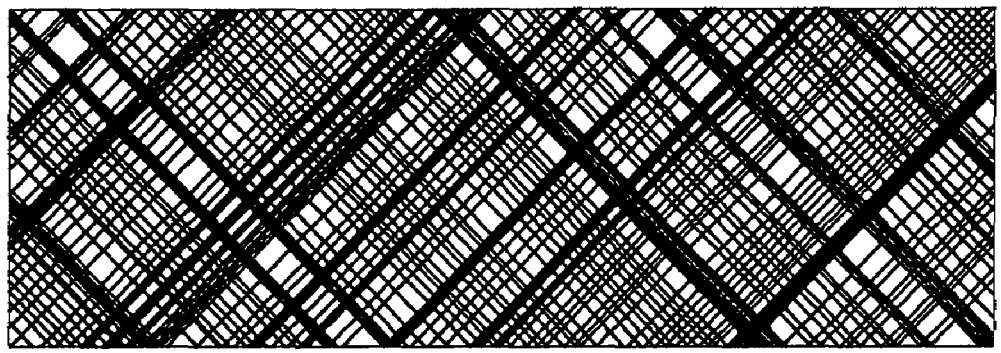
FIG. 13 shows a section of the mask produced in FIG. 12.

The mask function can be formed in several ways. For example, the "V" slit approach may be used as shown in FIGS. 2, 3 and 4, or an equivalent approach is presented, which superimposes two one dimensional URA patterns that are rotated ±45° respectively from one another as shown in FIG. 12. A suitable section of the URA pattern is selected as shown in FIG. 13, under which the linear detector is situated. FIGS. 12 and 13 show a 103 point URA.

The invention principles taught herein have assumed that the detected image is an unmagnified replica of a segment of the mask, while in reality, for emitters located at finite distances, the image is magnified. The degree of magnification increases as the emitter distance decreases. To account for the magnification effect, the URA length is chosen to be shorter than the detector length to ensure that a full URA sequence is received. From the detector array, a portion is selected to correlate with an appropriately scaled mask pattern, so that an accurate comparison can be made. In practice, determining the magnification may be an iterative approach such that the best degree of correlation is used to select a particular mask magnification and detector length.

As such, an invention has been disclosed in terms of preferred embodiments thereof that fulfill each and every one of the objects of the invention as set forth hereinabove, and provide a new and useful sensor for determining the angular position of a point radiating source in two dimensions of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

The invention claimed is:

1. A sensor for determining the angular position of a radiating point source in two dimensions, comprising:
   a) a point source of light located in a prescribed space;
   b) a one-dimensional light detector comprising a single linear row or column of active elements adjacent said space;
   c) a two dimensional mask interposed between said detector and said space, said mask having a two dimensional pseudo-random surface pattern defining a prescribed degree of transmissivity, said surface pattern comprising a plurality of V-shapes, at least some of said V-shapes overlapping one another, non-overlapping portions of said pattern having a first degree of transmissivity and overlapping portions of said pattern having a second degree of transmissivity;

d) whereby light from said source travels through said mask and onto said detector, said surface pattern causing said detector to sense two correlation signal peaks usable to indicate incident angle between said source and detector in two dimensions.

2. The sensor of claim 1, wherein said V-shapes comprise an analog or continuously varying pseudo-random sequence of V-shapes.

3. The sensor of claim 1, wherein said surface pattern comprises analog or continuously varying pseudo-random transmissivity components.

4. The sensor of claim 1, wherein said surface pattern comprises digital or discretely varying pseudo-random transmissivity components.

5. The sensor of claim 1, wherein said second degree is greater than said first degree.

6. The sensor of claim 5, wherein said first degree comprises 50% transmissivity.

7. The sensor of claim 5, wherein said second degree comprises 100% transmissivity.

8. The sensor of claim 6, wherein said second degree comprises 100% transmissivity.

9. The sensor of claim 1, wherein said mask is rectangular.

10. The sensor of claim 1, wherein said detector comprises a charge coupled device (CCD).

11. The sensor of claim 9, wherein said detector comprises a charge coupled device (CCD).

12. The sensor of claim 9, wherein said mask extends laterally of said detector.

13. A sensor for determining the angular position of a radiating point source in two dimensions, comprising:

a) a point source of light located in a prescribed space;

b) a one-dimensional light detector adjacent said space;

c) a two dimensional rectangular mask interposed between said detector and said space, said mask having a two dimensional pseudo-random surface pattern defining a prescribed degree of transmissivity, said surface pattern comprising a plurality of V shapes at least some of which partially overlap one another, non-overlapning portions of said pattern having a first degree of transmissivity and overlapping portions of said pattern having a second degree of transmissivity;

d) whereby light from said source travels through said mask and onto said detector, said surface pattern causing said detector to sense two correlation signal peaks usable to indicate incident angle between said source and detector in two dimensions.

14. The sensor of claim 13, wherein said first degree comprises 50% transmissivity.

15. The sensor of claim 13, wherein said second degree comprises 100% transmissivity.

16. The sensor of claim 14, wherein said second degree comprises 0% transmissivity.

17. The sensor of claim 13, wherein said detector comprises a charge coupled device (CCD).

18. The sensor of claim 13, wherein said mask extends laterally of said detector.

* * * * *